US006098777A

United States Patent [19]

[11] Patent Number: 6,098,777

[45] Date of Patent: Aug. 8, 2000

Hoffman et al.

[54] METHOD AND APPARATUS FOR DISCRIMINATING DIFFERENT COINS IN FREE FALL

[75] Inventors: Kirk D. Hoffman, Yorkville; Robert Huizenger, Woodridge; Joe Ferrantelli, Orland Park, all of Ill.

[73] Assignee: Coin Mechanisms, Inc., Glendale Heights, Ill.

[21] Appl. No.: 09/175,024

[22] Filed: Oct. 19, 1998

Related U.S. Application Data

[63] Continuation-in-part of application No. 08/940,536, Sep. 30, 1997

[60] Provisional application No. 60/027,214, Sep. 30, 1996.

[51] Int. Cl.[7] .............................. G07D 5/08; G01N 27/72

[52] U.S. Cl. ...................... 194/318; 324/207.17; 324/239

[58] Field of Search .................................... 194/318, 317, 194/319; 324/239, 241, 207.19, 207.17

[56] References Cited

U.S. PATENT DOCUMENTS

| | | | |
|---|---|---|---|
| 5,056,644 | 10/1991 | Parker | 194/318 |
| 5,078,252 | 1/1992 | Furuya et al. | 194/318 |
| 5,131,518 | 7/1992 | Shimizu | 194/318 |

*Primary Examiner*—Robert P. Olszewski
*Assistant Examiner*—Bryan Jaketic
*Attorney, Agent, or Firm*—Leydig, Voit & Mayer

[57] ABSTRACT

A method and apparatus for identifying a coin in free fall employs a coin sensor that has a pair of drive coils for generating a horizontally elongated magnetic field across a free-fall path of the coin. The drive coils are driven by a square wave, and ringing waveforms induced in a pair of sensor coils disposed on the two sides of the free-fall path are measured when the coin passes through the magnetic field. A digitized signature is derived from the measured ringing waveforms and compared to a set of pre-stored reference signatures to find a match. A diverter mechanism directs the coin to an accept path when a match is found and to a reject path when a match is not found.

23 Claims, 12 Drawing Sheets

METHOD AND APPARATUS FOR DISCRIMINATING DIFFERENT COINS IN FREE FALL

This application is a continuation-in-part of U.S. Application Ser. No. 08/940,536, filed on Sep. 30, 1997, which claims the benefit of U.S. Provisional Application Ser. No. 60/027,214, filed Sep. 30, 1996.

FIELD OF THE INVENTION

This invention relates generally to a coin discriminating apparatus, and more particularly to a coin discriminating apparatus which is capable of verifying the validity of coins having a plurality of denominations while they are in free fall.

BACKGROUND OF THE INVENTION

Coin discriminating apparatus capable of validating coins are known in the art. In such prior art apparatus, test coins are typically directed down a defined path such as a ramp where they pass a number of spaced sensor coils at least one of which is energized to generate magnetic fields. The interaction between the tested coin and the magnetic field generated by the coils enable these apparatus to identify the coin. Specifically, coins having different material compositions and/or sizes will effect the generated magnetic fields differently. A sensing circuit associated with a sensor coil in proximity to the coil generating the field monitors these effects and collects data reflecting changes in the sensed magnetic field. This data can be compared to information stored in memory to determine the denomination and authenticity of the tested coin.

For example, U.S. Pat. No. 4,469,213 and U.S. Pat. No. 4,437,558, which are both hereby incorporated by reference in their entirety, describe a coin discrimination apparatus that utilizes a three-coil stack to identify coins in a manner similar to that described above. The two outer coils of the stack are supplied with identical currents such that magnetic fields are created in the two gaps defined by the three coils. The two outer coils are aligned with the center coil in opposing relation and are similarly energized. Thus, the magnetic fields generated by the two outer coils generally cancel in the region of the center coil, leaving a net electric field of zero (a null) within the center coil.

In use, a sample coin, the type of coin that the discrimination system is intended to accept, is positioned in one of the two gaps between the three coils. As a result, the magnetic field across the sample coin gap is attenuated, thereby preventing a null in the center coil. When a test coin is placed into the discrimination system, it passes through the second gap of the three-coil stack. When the test coin is in the second gap, it attenuates the magnetic field across that gap. If the test coin is identical to the sample coin in the first gap, the attenuation in the opposed magnetic fields will likewise be the same and a null will occur in the center coil. Electronic circuitry is provided to sense the quality of this null to determine whether the test coin matches the sample coin.

U.S. Pat. No. 5,568,855 improves upon the invention of the above-referenced U.S. Patents by providing improved electromagnetic interference protection and by providing a further array of sensors downstream of the identification coils to provide enhanced fraud protection. U.S. Pat. No. 5,568,855 is hereby incorporated by reference in its entirety.

While methods of the above type are generally accurate and effective in performing coin discrimination, certain areas for improvement have been noted. For example, one drawback associated with such methods is that the geometry of the coils in relation to the coin strongly influences the degree of interaction between the coin and the sensor coils. In at least one embodiment of the method disclosed in U.S. Pat. No. 4,469,213, a specific point known as the comparison point on the sample coin is compared to a comparison band along the test coin being passed through the discriminator. The comparison point on the sample coin is the focal point of the circular coils. The comparison band on the test coin, on the other hand, spans a line along the surface of the test coin which is parallel to the descent path of that coin as it passes the comparison point of the sample coin. In other words, whereas in the example shown in FIG. 1, the comparison point 5 of the sample coin would be a relatively specific circular area preferably at the center of that coin, the comparison band 8 on the test coin would be a much larger area spanning the entire length of the coin as it passes through one of the gaps of the sensor coils (represented by the area between the diagonal lines in that same figure).

However, it is possible for the test coin to have a point somewhere along the comparison band 8 that, while not corresponding to the comparison point 5 in location, is nonetheless substantially identical to the material composition of the sample coin at the comparison point 5. This similarity can cause a null that misidentifies the test coin as identical to the sample coin. In other words, if somewhere along the comparison band the test coin appears identical to the comparison point of the sample coin, and if that point of identity is located at a position that does not correspond to the comparison point, a misidentification of the test coin can occur.

Another drawback of prior art designs is that the speed at which successive coins can be processed and identified is limited. One reason for this speed limitation involves the fact that a specific comparison point of a sample coin is being compared to a band on the test coin. Since only a portion of the sample coin is being sampled for the comparison, the travel path of the test coin must be controlled to ensure the test band of a valid coin would include the area of the test coin corresponding to the comparison point on the sample coin. To achieve this goal, coins typically have to be stabilized before they are passed through the gap of the sensor coils. In prior art devices such stabilization occurs by rolling the test coin down a ramped surface thereby preventing the test coin from free falling and ensuring proper alignment with the coils. In some instances, mechanical means are employed to hold the test coin against a reference surface thereby ensuring proper positioning with respect to the sensor coils.

Prior art coin discriminators are also limited in the type of coins they can validate. For example, three coil stack discriminators of the above type are only capable of identifying and accepting one coin denomination at any given time. If the user wishes the coin discriminator to accept other coin denominations, the user must physically open the device and replace the current sample coin with a new sample coin of a different denomination.

In order to overcome this limitation, some prior art apparatus have employed multiple stacks of coils positioned along the test coin travel path wherein each stack of coils includes a sample coin of a different denomination. However, employing multiple sensors in this manner increases the time needed for the microprocessor to identify a test coin, thereby increasing the delay time needed before the next test coin can be considered.

As mentioned above, some prior art discriminators are susceptible to electromagnetic interference from outside sources. If such discriminators are exposed to outside sources of electromagnetic energy, then a satisfactory null may not exist in the center coil despite the fact that the test coin and sample coin are identical.

The above characteristics of existing coin discriminators limit performance criteria such as: coin feed rate, coin identification accuracy (including susceptibility to outside electromagnetic interference), and the number of different coins that can be accepted without modification at any given time. These characteristics are crucial for machines such as gaming machines in which coins are inserted at a very fast rate.

OBJECTS OF THE INVENTION

It is, therefore, a general object of the invention to provide an improved coin discriminating apparatus. More specifically, it is an object of the invention to provide an improved coin discriminator that more accurately identifies coins than prior art discriminators.

It is another object of the invention to provide a coin discriminator which identifies coins as they free fall. It is a related object to provide a coin discriminator which can identify coins of different denominations within a single vertical chute of fixed dimensions. It is another related object to provide such a mechanism wherein the identified coins can have varying shapes or sizes including different diameters and still be correctly identified.

It is another object to provide a coin discriminator which employs a single, horizontal magnetic field for identifying coins. It is a related object to provide such a device wherein the horizontal magnetic field is generated by a pair of aligned inductive field generating coils, with a pair of passive inductive sensor coils situated between the generating coils.

It is another object of the invention to provide an improved coin discriminator which achieves faster coin validation than prior art devices. It is a related object to provide such a device wherein only one sensor is used to identify coins of different denominations.

It is another object of the invention to provide a coin discriminator which has the capability to sort valid coins.

It is another object of the invention to provide improved coin discriminating apparatus of the above types which includes direction sensing sensors to reduce the occurrence of fraud.

SUMMARY OF THE INVENTION

The present invention accomplishes these objectives by providing a method and apparatus for discriminating coins in free fall. In accordance with one aspect of the invention, a coin sensor is provided which employs a substantially horizontal magnetic field to obtain a signature of a free falling test coin. That signature is compared to signatures of sample coins in memory. If a match is found the coin is permitted to free-fall down an accept path.

In accordance with another aspect of the invention, the free-falling coins are identified, accepted coins are sorted between alternative accept paths, and the travel direction of the accepted coins are verified for fraud protection, all as the coin free-falls a short vertical distance.

In accordance with a feature of a preferred embodiment of the invention, changes in the ringing waveforms of sensor coils caused by the presence of the coin in the detector are used to derive a signature of the coin. The signature of the coin is then compared to pre-stored signatures of sample coins to identify the type of the coin.

These and other features and advantages of the invention will be more readily apparent upon reading the following description of the preferred embodiment of the invention and upon reference to the accompanying drawings wherein:

DETAILED DESCRIPTION OF A PREFERRED EMBODIMENT

It will be understood that throughout this specification and the appended claims, the term "coin" shall include both currency issued by any government (for example, nickels, quarters and the like issued by the U.S. government), and tokens manufactured for use in casinos, arcades and the like.

Figure 1:
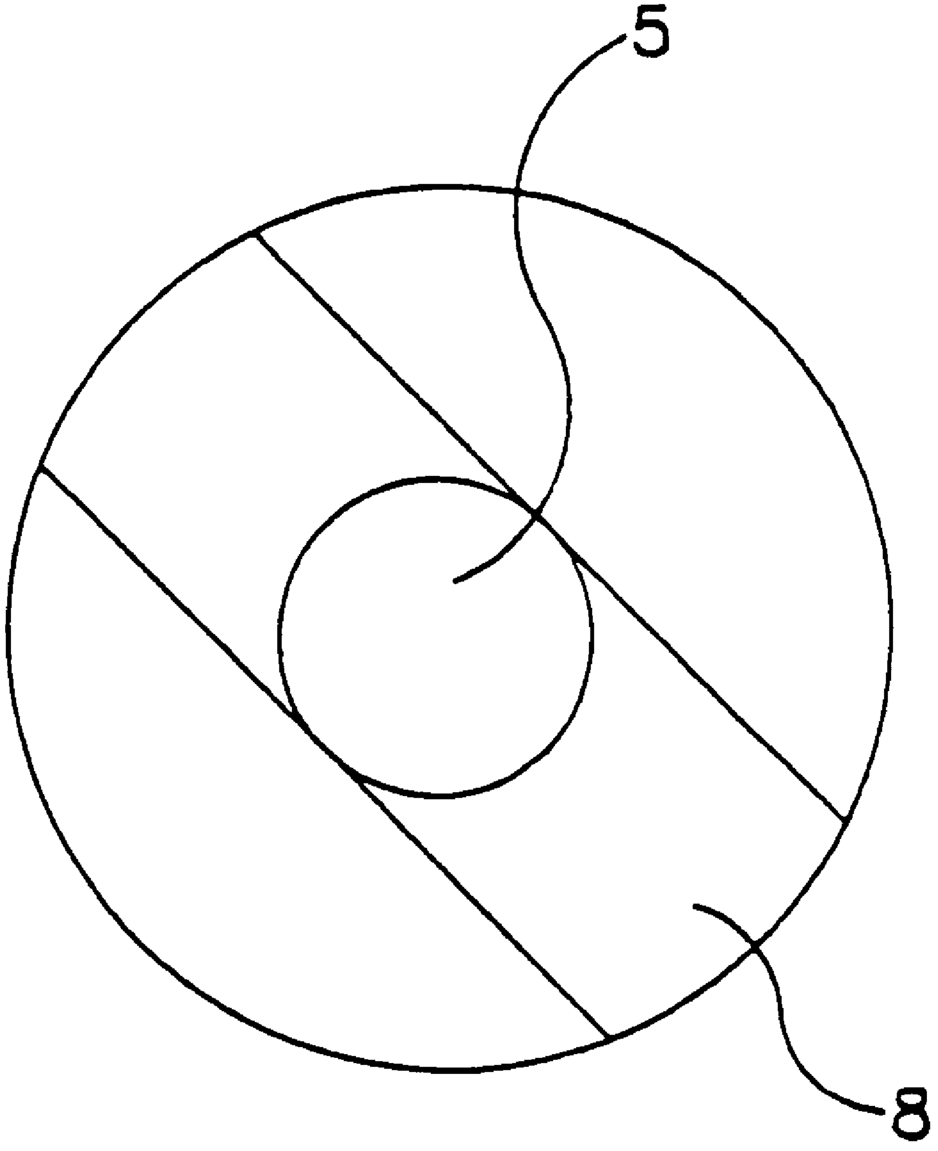
FIG. 1 is a diagrammatic illustration of the respective positions of an exemplary comparison point and an exemplary comparison band relative to a coin as sampled by prior art coin discriminators.
Figure 2:
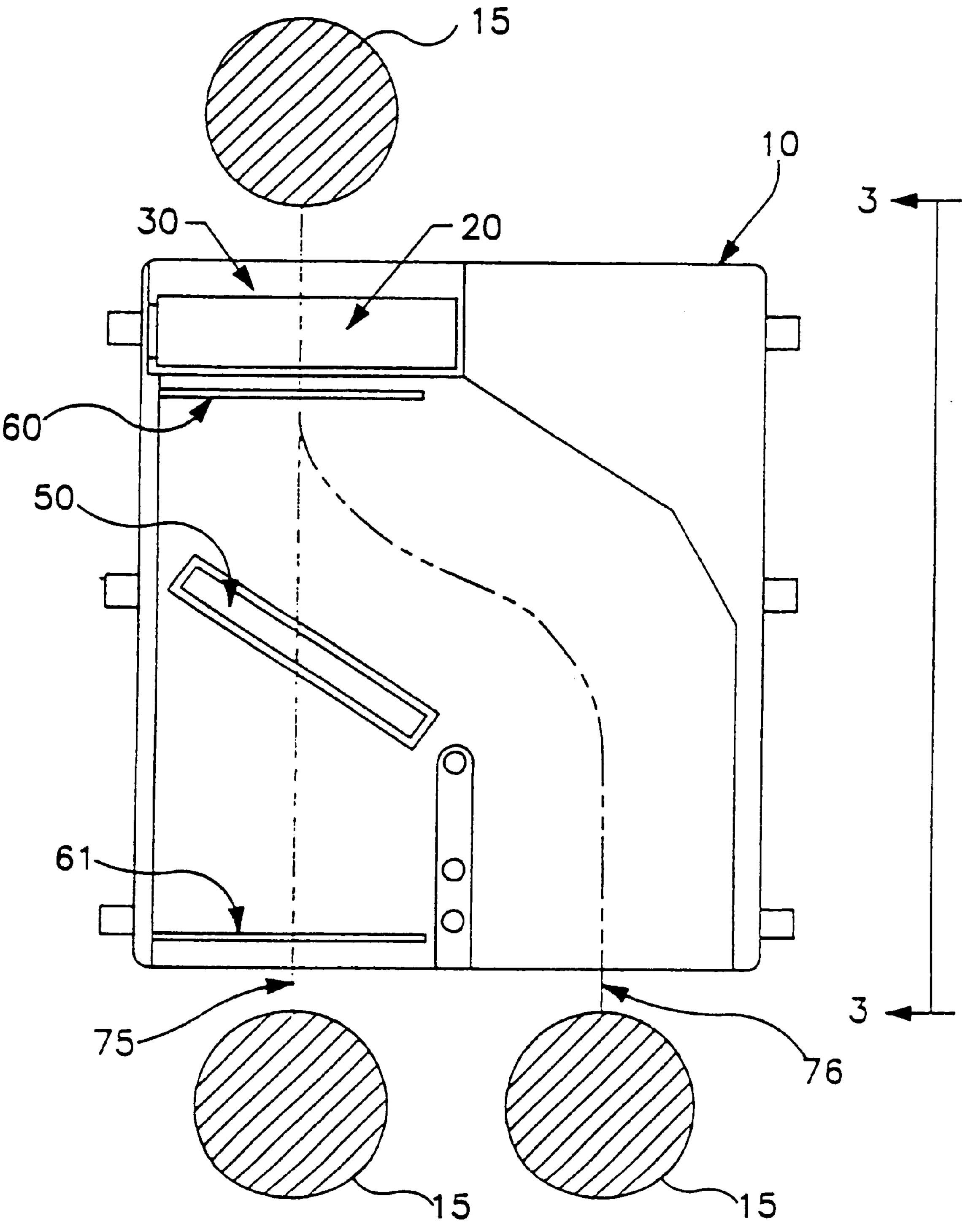
FIG. 2 is a schematic view of the identification stage of a coin discriminator constructed in accordance with the teachings of the instant invention.

FIG. 2 illustrates generally a coin discrimination apparatus 10 constructed in accordance with the teachings of the instant invention. Although no dimensions are given in the drawing, the apparatus 10 is preferably constructed to be approximately 3½ inches wide and 4 inches tall, and to have a depth of approximately 2 inches. These dimensions make the illustrated apparatus 10 ideal for use as a coin discriminator in gaming apparatus such as slot machines and the like. As explained in further detail below, the inventive coin discriminator 10 is able to: identify free falling coins 15 of different denominations and sizes; accept or reject deposited coins 15 as appropriate; divert accepted coins 15 between two separate accept paths; and perform fraud testing, all within the envelope described above. In particular, in the instance of an accepted valid coin 15, all of these actions are performed as the coin 15 free falls a vertical distance of approximately 4 inches through a chute of fixed dimension in the inventive apparatus 10.

In order to perform these functions, the disclosed embodiment of the inventive coin discriminating apparatus 10 is provided with a unique coin identification sensor 20, an acceptance gate 50, a diverter ramp 54, a guide plate 56, a fiber optic array of sensors 60, 61 and a control circuit 70. The structure and operation of the control circuit 70 will be discussed in detail below. For the present, it should be noted that the control circuit 70 monitors the output signals of the coin identification sensor 20, and based on those signals, selectively energizes the acceptance gate 50, the diverter ramp 54 and the guide plate 56 to control the travel path and, thus, the ultimate destination of the test coin. In the case of a valid coin 15, the control circuit 70 also monitors the output signals of the fiber optic array sensors 60, 61 to detect fraud and to prevent jamming of the test coin in the diverter mechanism as explained in further detail below.

Figure 5A:
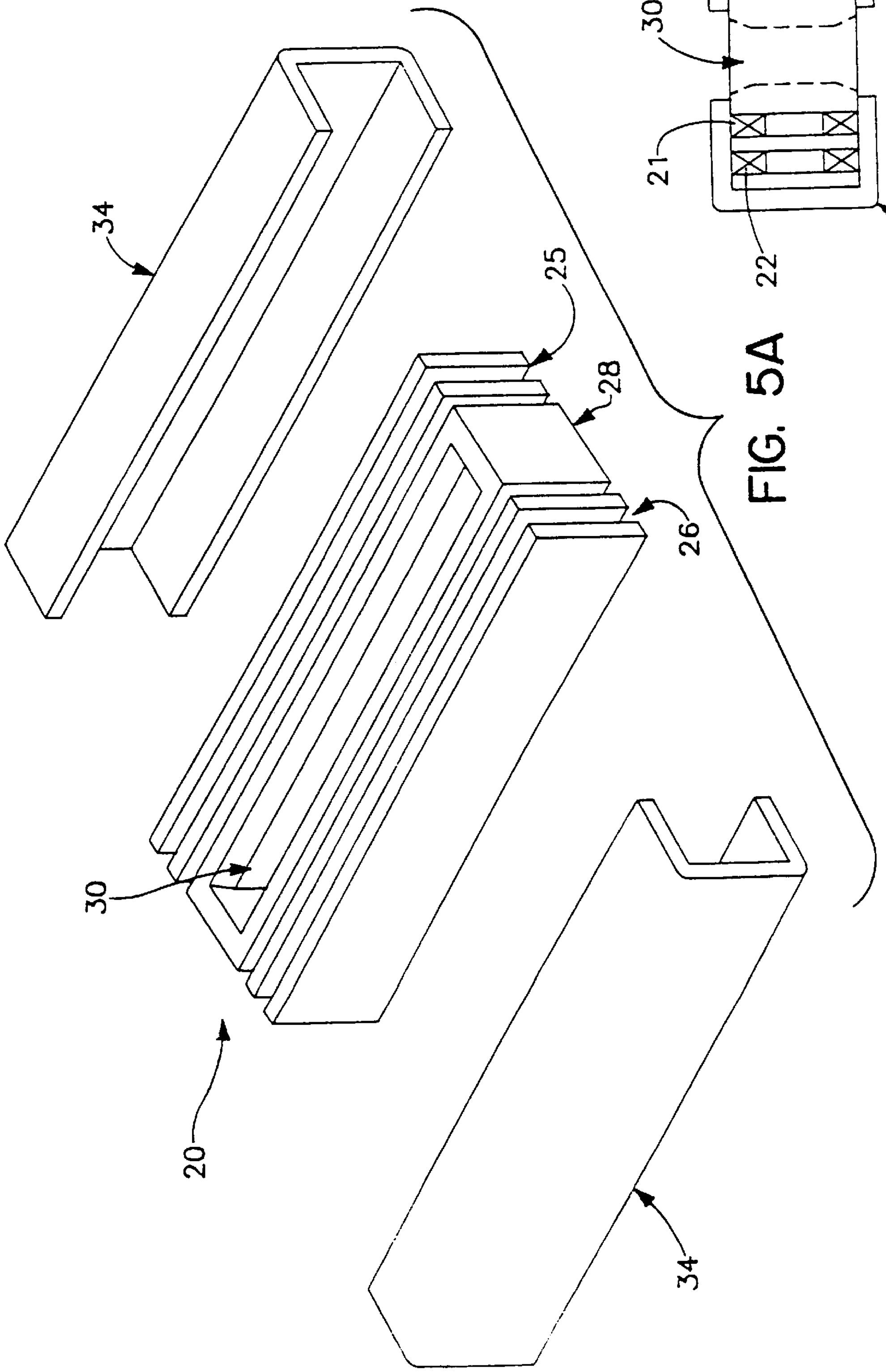
FIG. 5A is a right, front perspective view of the coil support structure used in the coin identification sensor.
Figure 5B:
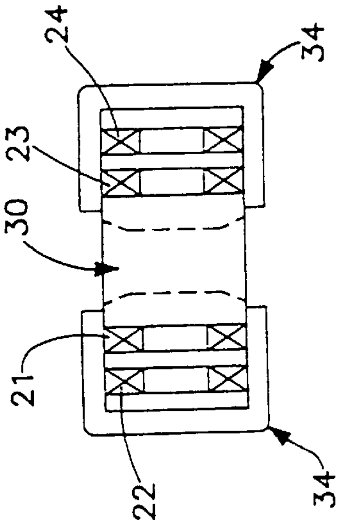
FIG. 5B is a cross sectional view of the coil support structure used in the coin identification sensor.
Figure 6:
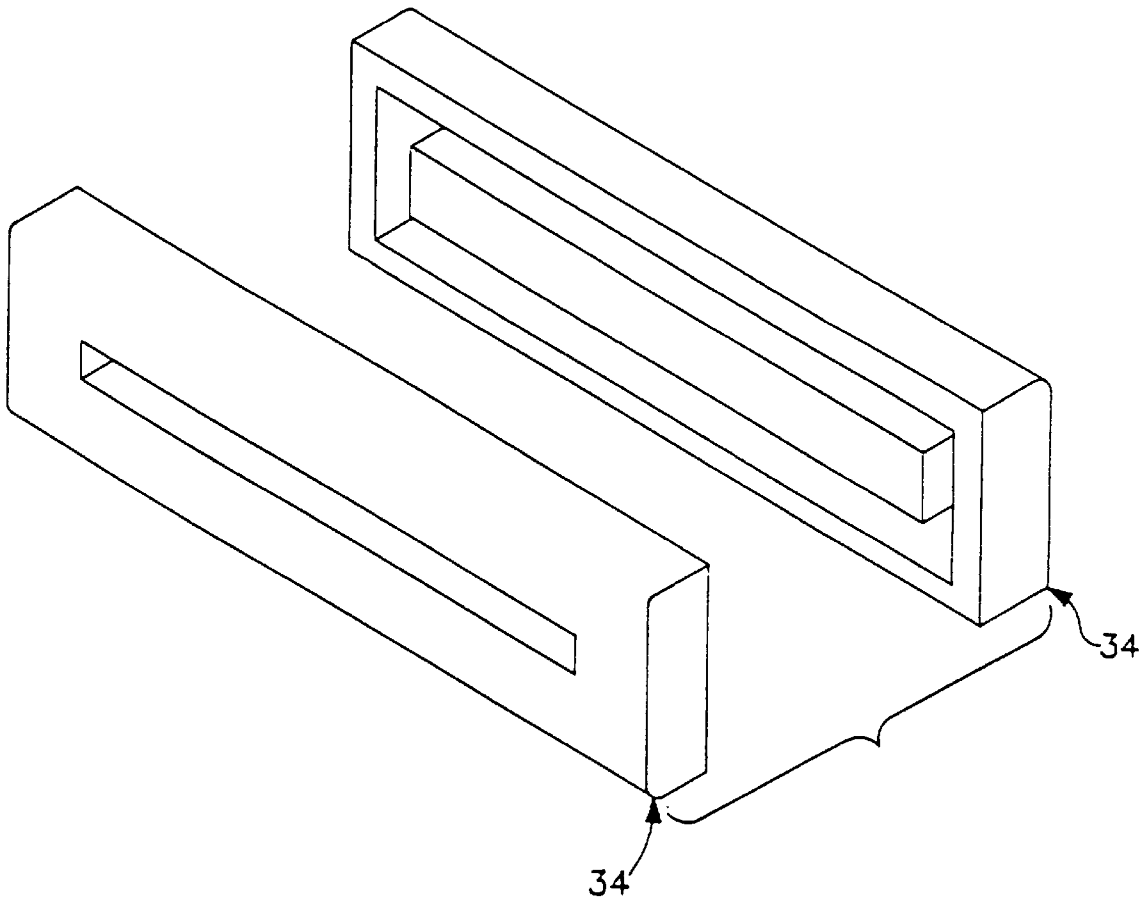
FIG. 6 is a right, front perspective view of the molded ferrite cores used in the coin identification sensor.

In accordance with an important aspect of the invention, the coin discrimination apparatus 10 employs a focused reference magnetic field with a horizontally elongated pattern to identify test coins 15 by sensing the characteristics of those coins as they free fall. To this end, the coin discriminator 10 is provided with an inventive coin identification sensor 20 which includes a coil support structure 28. As shown in FIG. 5, the coil support structure 28 preferably comprises molded plastic which defines a central coin slot 30 for receiving coins or tokens. The coin slot 30 forms the entry port for submitting coins 15 into the coin discriminator 10 and defines the path for the coin to go through the coin identifying sensor 20 in a free fall motion. In addition, two identical outer drive coils 22, 24 are equally spaced on either side of the coil slot 30, two identical inner sensor coils 21, 23 are placed between the drive coils 22, 24 and adjacent to the coin slot 30, and two ferrite cores 34 are provided for shielding coils 21–24.

In order to generate the focused horizontal reference magnetic field mentioned above, the two drive coils 22, 24 are wound in the same direction in an exaggerated elliptical form about respective bobbins 25, 26 formed on the coil support structure 28. In the preferred embodiment, the major axis of the ellipse formed by the inductive coils 22, 24 are parallel to the length of the coin slot 30 formed in the coil support structure 28. As shown in FIG. 5, the bobbins 25, 26 are positioned on opposite sides of coin slot 30. Thus, coins 15 placed into the coin discriminator 10 must pass between the two inductive coils 22, 24 disposed on the bobbins 25, 26. As will be described in greater detail below, the horizontally elongated pattern of the magnetic field, in contrast to the circular pattern of conventional coin discriminators, enables the coin identification sensor 20 to sense when the full diameter (or width) of the coin in free fall passes through the magnetic field and to take an electromagnetic signature of the coin at that moment for identification thereof.

In order to focus the magnetic field generated by the inductive coils 22, 24 in a substantially linear, substantially horizontal position across the coin slot 30, the two outer drive coils 22, 24 oscillate such that one coil is generating the field in one direction, while the other coil is generating a field in the same direction so as to optimize the magnetic circuit across the coin slot 30.

As explained in U.S. Pat. Nos. 4,469,213 and 4,437,558, which have already been incorporated herein by reference, coins 15 of different sizes and material compositions will effect the coupling of the magnetic field generated by coil 22 to coil 24 differently. In other words, each coin 15 passing through slot 30 will attenuate the current induced in sensor coils 21, 23 in a manner dependent upon the size and material composition of that particular coin. Coins 15 of the same type have the same effect on the current sensed in inductive coils 21, 23, whereas coins 15 of different sizes, different material compositions, or both, will have different effects on that current. The effect a given coin 15 has on the current sensed in the sensor coils 21, 23 is referred to in this application as the "signature" of that coin 15.

The coil support structure 28 may be provided with an end projection (not shown) which is employed as a support for connecting lead wires to inductive coils 21–24. The lead wires are used to provide a controlled oscillating current to the two outer drive coils 22, 24 thereby generating a magnetic field, and to monitor the current induced in the sensor coils 21, 23 by the generation of that magnetic field. Since the coils 22, 24 are positioned on opposite sides of coin slot 30, the magnetic field generated by the energizing of coil 22 must pass through coin slot 30 and sensor coils 21, 23 to reach coil 24 and vice versa.

The ferrite cores 34 serve multiple functions. First, since they are substantially impenetrable to external magnetic fields, they protect the coils 21–24 from electromagnetic interference from external sources of electromagnetic energy. Second, and perhaps more significantly, they contain the magnetic field generated by the two drive coils 22, 24.

The magnetic field generated by inductive coils 22, 24 forms a horizontal field across slot 30 which induces a current in inductive coils 22, 24. The field present in coils 21, 23 is attenuated by a coin 15 passing through coin slot 30. Thus, by sensing the current induced in sensor coils 21, 23, the discriminating apparatus 10 can sense the characteristics of the coin 15 in slot 30.

As shown in FIG. 2, the coin discriminator 10 includes two primary travel paths for test coins 15, namely, an accept path 75 and a reject path 76. As their names suggest, accept path 75 is designed to receive valid coins 15. On the other hand, coins 15 which are determined to be unacceptable are diverted down the reject path 76. Depending upon user preference, the reject path 76 can be constructed to return the test coins 15 to the depositor, or it can be constructed to retain invalid coins 15. The former alternative is preferred in most instances.

To control which of these two paths a test coin 15 will take, the coin discriminator 10 is provided with an acceptance gate 50 which is preferably pivotably mounted above the accept path 75. The acceptance gate 50 preferably includes an associated actuator (not shown) and is electromagnetically actuable such that the control circuit 70 can cause the gate 50 to pivot by generating an appropriate electrical signal. In the illustrated embodiment, pivoting acceptance gate 50 in this manner will permit a test coin 15 to enter the accept path 75. If a pivot signal is not received from the control circuit 70 the acceptance gate 50 will not move, but will instead divert the unacceptable test coin 15 down the reject path 76. As will be appreciated by those skilled in the art, the structure and operation of acceptance gate 50 is conventional, and will not be further discussed here.

It will further be appreciated by those skilled in the art that the acceptance gate 50 could be arranged such that it permits test coins to enter the acceptance path 75 unless the control circuitry 70 pivots the gate 50 closed without departing from the scope or spirit of the invention. Such an approach is, however, not preferred because, in the event of power failure, any submitted test coins 15 will be accepted (although preferably not credited) rather than being automatically rejected and returned to the depositor as would occur in the preferred approach shown in FIG. 2.

Those skilled in the art will further appreciate that the relative position of the accept and reject paths 75, 75 could be reversed in FIG. 2 such that acceptance gate 50 is located above reject path 76 without departing from the scope of the invention. Such an approach is not, however, preferred since interfering with the free fall of accepted coins 15 would necessarily introduce time delays in accepting coins as compared to the preferred approach shown in FIG. 2.

Although for clarity of illustration, they are not shown in FIG. 2, the preferred embodiment of the coin discriminator 10 is provided with a diverter ramp 54 and a guide plate 56 which together function as a diverter mechanism to divert accepted coins 15 down one of two possible accept paths 78, 79. By way of explanation, in certain gaming machines and the like, it is sometimes desirable to deposit a portion of the accepted coins in a cash box and the remaining portion in a hopper. For example, in a slot machine, it is desirable to deposit some of the inserted test coins 15 into a hopper for payouts when a "jackpot" occurs.

To this end, the diverter ramp 54 and guide plate 56 are pivotably disposed downstream from the acceptance gate 50. Like acceptance gate 50 they have associated actuators 55, 57 which are preferably electromagnetically actuable such that appropriate control signals from the control circuit 70 will pivot the diverter ramp 54 and the guide plate 56 between the positions illustrated in FIGS. 3A and 3B. When the ramp 54 and the plate 56 are in the position shown in FIG. 3A, accepted coins 15 free fall all the way through the coin discriminator 10 without being diverted and exit the device 10 through alternative accept path 79. On the other hand, when the ramp 54 and plate 56 are pivoted to the position shown in FIG. 3B, accepted coins 15 are diverted to exit the apparatus 10 via alternative accept path 78.

Figure 3B:
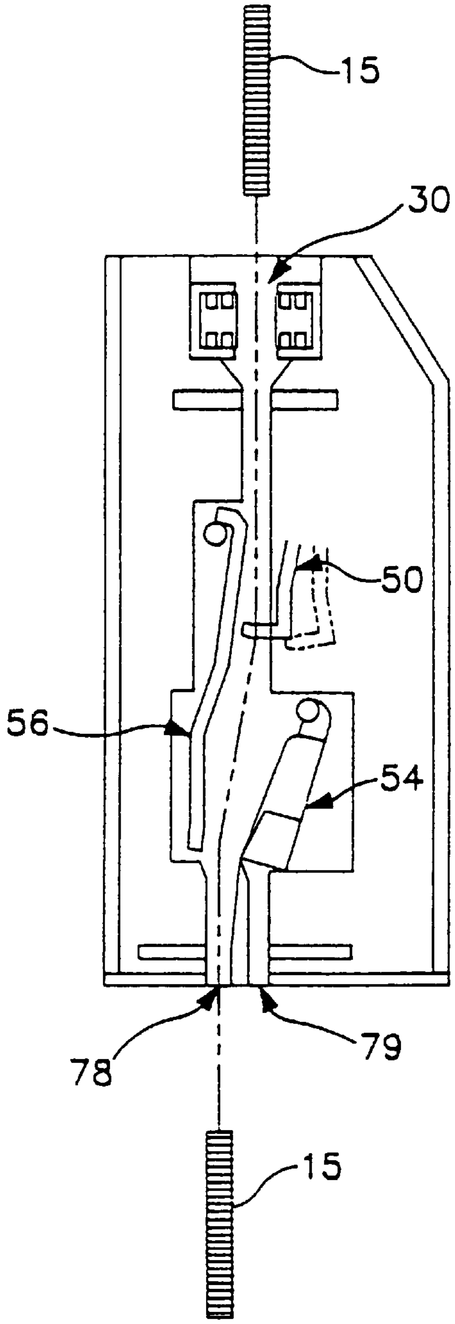
FIG. 3B is a view similar to FIG. 3A but showing the diverter mechanism in a second accept position.
Figure 3A:
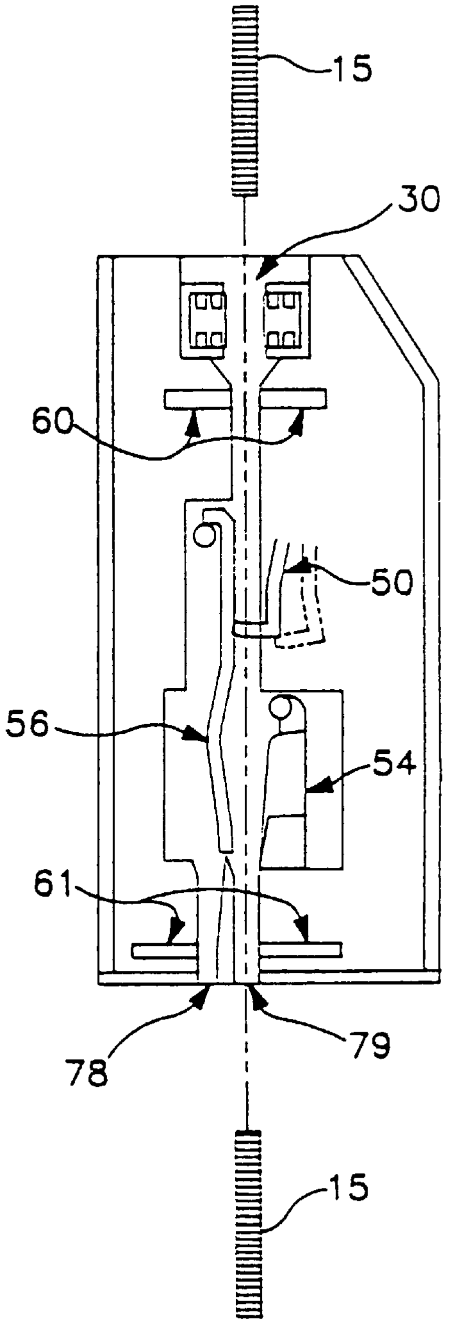
FIG. 3A is a schematic view of the coin discriminator apparatus of FIG. 2 taken along lines 3—3 of FIG. 2 and showing the diverter mechanism in a first accept position.

Those skilled in the art will appreciate that the orientations of the ramps 54 and plate 56 can be reversed to divert coins in the direction opposite that shown in FIGS. 3A and 3B without departing from the scope or the spirit of the invention. Likewise, it will be appreciated that only one pivotable diverting mechanism could be employed instead of two as illustrated in the disclosed embodiment without departing from the scope of the invention.

For the purpose of preventing jams in the diverter mechanism formed by diverter ramp 54 and guide plate 56, as well as to prevent fraud, the coin discrimination apparatus 10 is provided with two fiber optic array sensors 60, 61. As shown in FIGS. 2, 3A and 3B, the optical sensors 60, 61 are preferably positioned one below the magnetic sensor assembly, and one just above the coin exit. These sensors 60, 61 are coupled to the control circuit 70 to provide that circuit 70 with information about the movement of coins 15 through the alternate accept paths 78, 79. For example, sensors 60, 61 provide the control circuit 70 with information as to whether an accepted test coin 15 has cleared that diverter mechanism. Until the accepted test coin has cleared the area, the control circuit 70 will not pivot either diverter ramp 54 or guide plate 56. This precaution prevents the accepted coins 15 from becoming trapped or otherwise jammed between either the pivoting diverter ramp 54 or the guide plate 56 and the internal structures of the apparatus 10. For clarity it should be noted that, the diverter mechanism is moved to select an alternative accept path when appropriate before the time in which the accepted coin enters the diverter mechanism. Once that pivoting movement has occurred, the microprocessor 80 monitors sensors 60, 61 for clearance before permitting additional movements of the diverter mechanism.

In addition to the timing function discussed above, the optical sensors 60, 61 also provide the control circuit 70 with information concerning the travel direction of the accepted coin 15 to prevent coins on strings and other techniques from being used to defraud the apparatus 10. For example, the fiber optic array sensors 60, 61 may be comprised of two bundles of optical fibers each gathered at one end into a generally circular bundle and spread into a substantially uniform linear ribbon on the other end. The two ribbon ends are placed generally perpendicular to the coin path on either side thereof and are positioned directly across and in line with one another. The circular bundle of one fiber optic array is attached to an infrared generating light source (not shown), while the circular bundle of the other array is connected to an infrared sensing receptor (not shown). This configuration allows for accurate sensing of passing coins 15 by monitoring the amount of light transmitted from the emitter side to the receiving side. In particular, as a coin 15 passes, the amount of transmitted light decreases until the center of the coin is blocking a maximum amount of transmitted light. The amount of transmitted light then increases until the coin 15 is clear. This method of coin tracking allows for accurate counting of coins 15 even if the coins are falling edge to edge. By utilizing two of these fiber optic array assemblies in conjunction with the sensor coils 21, 23, the microprocessor 80 can insure against stringing of coins by tracking a coin's path from entry to exit. The fiber optic array is are not limited to the embodiment described above, but may also be used to measure the diameter of coins 15. Maximum blockage of transmitted light occurs when the diameter of any given coin passes the array. Therefore, each coin diameter will generate a specific value of blocked transmitted light which may correspond to its unique signature obtained inductively.

Those skilled in the art will appreciate that, although the illustrated embodiment employs two fiber optic array sensors 60, 61, any other number of sensors can be employed without departing from the scope or spirit of the invention. For example, other numbers of sensors can be employed to ensure detection of all sizes of coins 15. In addition, although the fraud and timing sensors 60, 61 have been described as optical sensors, it will be readily appreciated that other types of sensors could be employed in this role without departing from the scope of the invention.

Figure 4:
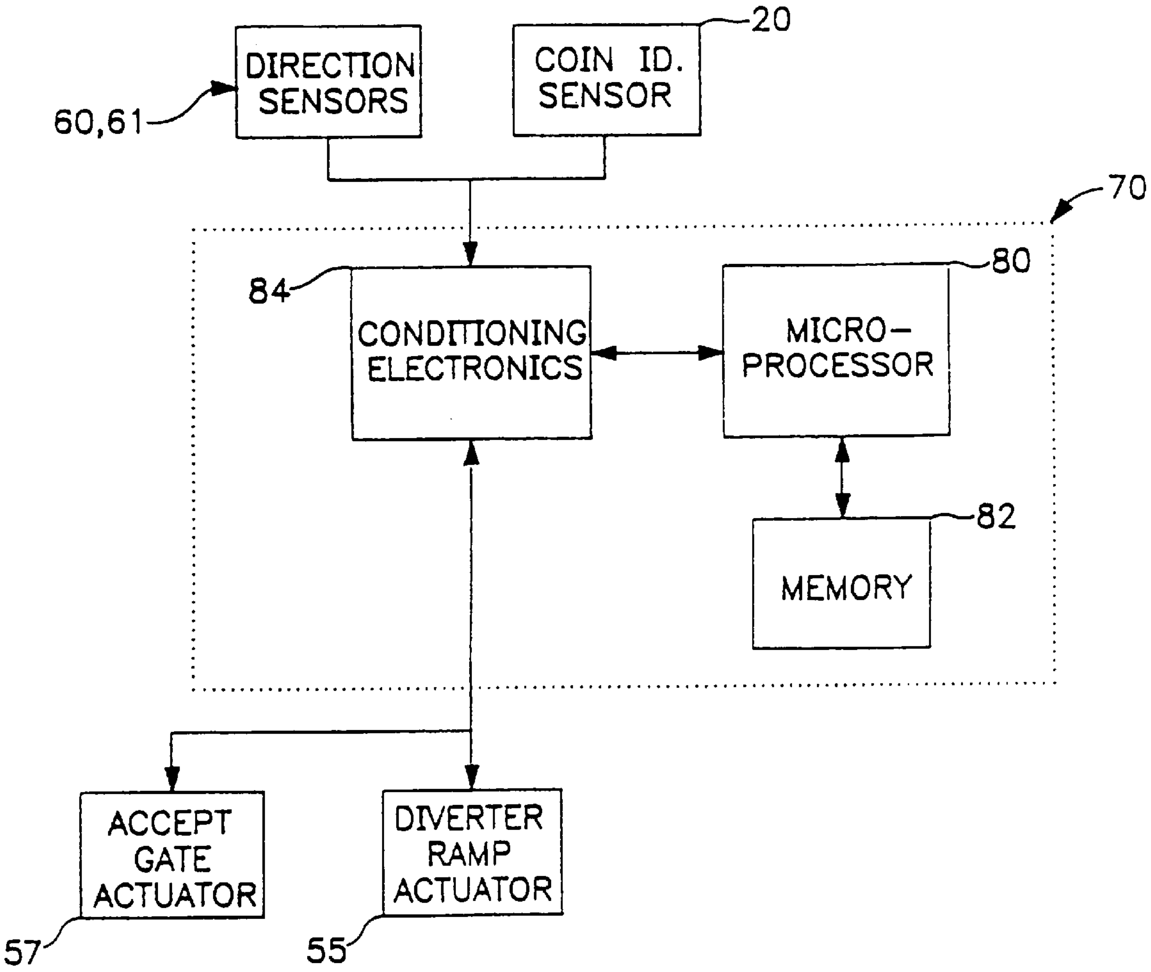
FIG. 4 is a block diagram illustrating the control circuitry employed in the apparatus of FIG. 2.

A block diagram illustrating the construction of a preferred embodiment of the control circuit 70 is shown in FIG. 4. Specifically, the control circuit 70 preferably comprises a microprocessor 80 with an associated memory 82, and signal conditioning electronics 84 to facilitate communication between the microprocessor 80 and the various sensors and actuators of the coin discrimination apparatus 10. Microprocessor 80 is the heart of the control circuit 70. It performs all of the calculations required to interpret the signals received from the sensors 20, 60, 61 and generates appropriate control signals to drive the actuators 51, 55 associated with acceptance gate 50, diverter ramp 54 and guide plate 56, respectively.

The memory 82 is preferably an addressable, nonvolatile memory which is used to store programmed instructions governing the operation of the microprocessor 80. The memory 82 is also used to store the electronic signatures of sample coins 15 the apparatus 10 is intended to accept. These sample coin signatures are generated by passing sample coins 15 of a known type through the apparatus. Once such signatures are developed, they can be stored in a suitable recording means such as a floppy disk and transferred into the memory 82 during assembly of the apparatus 10.

The conditioning electronics 84 preferably comprises analog-to-digital and digital-to-analog converters for respectively converting the outputs of the sensors 20, 60, 61 into a format suitable for use by the microprocessor 80 and for converting the outputs of the microprocessor 80 into a format suitable for use by the actuators 51, 55. Depending upon the precise electronics employed in the apparatus 10, the conditioning electronics 84 can also include other signal conditioning circuitry such as filters and level shifters.

Figure 7:
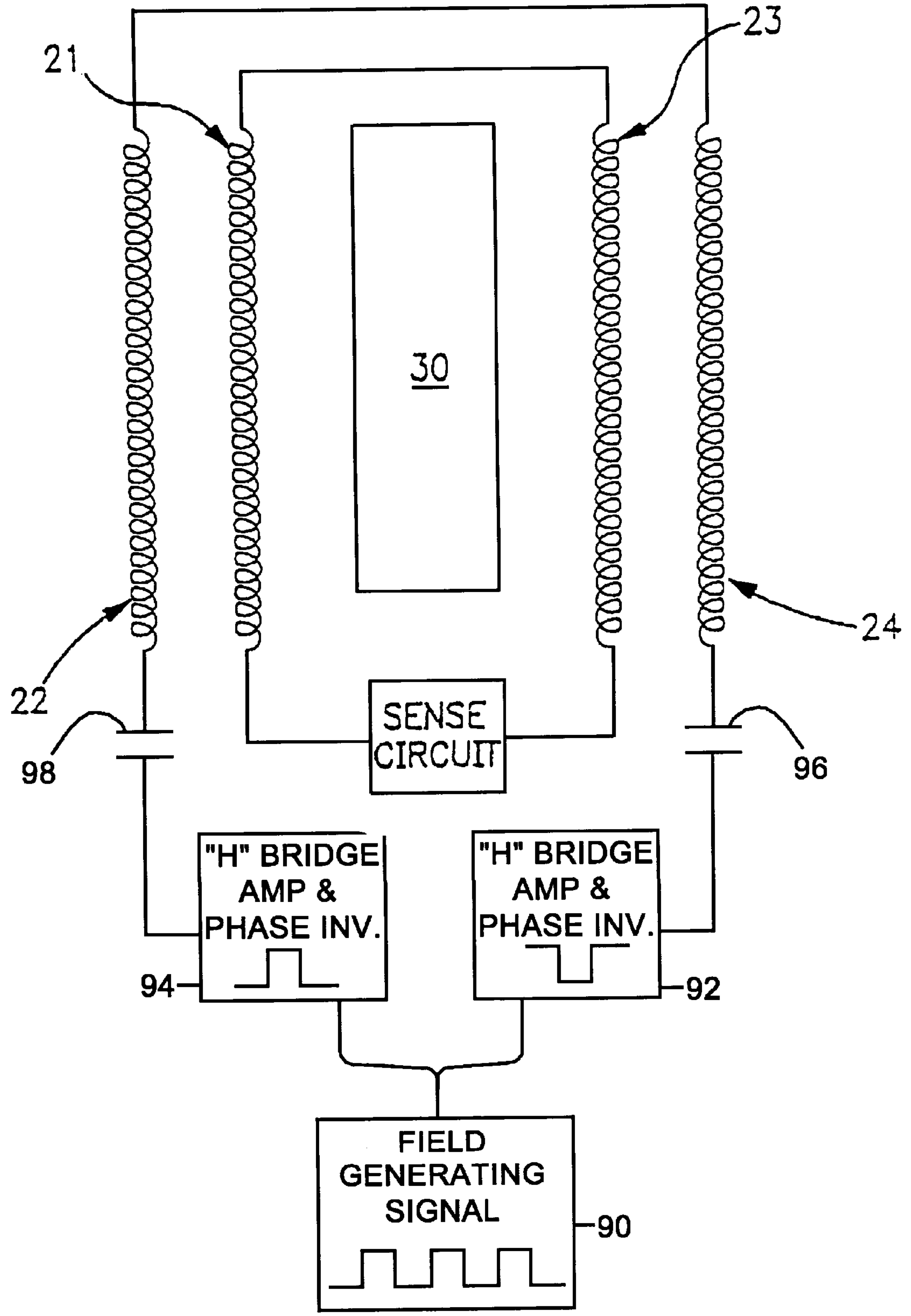
FIG. 7 is a schematic representation of the sensor coil assembly of the inventive coin discriminating apparatus.

In accordance with a feature of a preferred embodiment of the invention, the changes in the ringing characteristics of the sensor coils in response to the passing of a coin through the coin identification sensor 20 are used to identify the coin. More particularly, the drive coils 22, 24 are driven with square waves signals, and the ringing waveforms induced in the sensor coils 21 and 23 are detected for deriving a signature of the coin, which is analyzed to determine the type of the coin. As shown in FIG. 7, the coin discriminating apparatus includes a signal generator 90 that generates a field generating signal in the form of a square wave. In a preferred implementation, the square wave is a series of TTL pulses generated by the microprocessor 30 (FIG. 4). The frequency of the square wave is selected such that the ringing waveforms in the sensor coils 21 and 23 caused by each step in the square wave contains several cycles sufficient for providing information regarding the coin passing in free fall through the slot 30 of the sensor 20. In a preferred implementation, the square wave has a frequency of about 7 kHz.

The square wave generated by the signal generator 90 is sent to two driving circuits 92 and 94. Each of the driving circuits 92 and 94 contains an "H" bridge, an amplifier, and a phase inverter. The driving circuits are constructed such that the drive coils 22 and 24 are driven to generate a magnetic field in a first direction across the slot 30 in response to a step of the square wave with a rising edge and to generate a magnet field in a second direction opposite to the first direction in response to a step of the square wave with a falling edge. The outputs of the driving circuits 92 and 94 are couples to the drive coils 24 and 22, respectively, through capacitors 96 and 98. The capacitors 96 and 98 and the drive coils 24 and 22, together with other components in the driving circuits, form an RLC circuit for generating ringing waveforms in response to the steps in the square wave.

Figure 9:
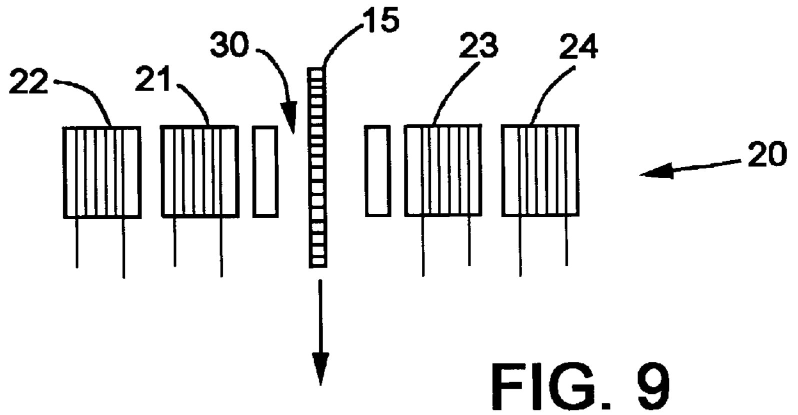
FIG. 9 is a schematic diagram of a coin in a slot between two sets of driver and sensor coils.

Referring to FIG. 9, when a coin 15 falls through the slot 30 of the coin identification sensor 20, it cuts through the magnetic field generated by the drive coils 22 and 24 across the slot. As a result, the shapes and amplitudes of the ringing waveforms induced in the sensor coils 21 and 23 are changed, and the changes depend on the position, size, composition of the coin. Generally, the presence of the coin 15 in the slot 30 retards the magnetic field and, among other things, attenuates the ringing amplitude. As will be described in greater detail below, the degree of attenuation of the ringing is used in a preferred implementation to determine when the diameter or full width of the coin crosses the magnetic field, and the ringing waveforms induced in the sensor coils 21 and 23 at that moment are detected for providing a "signature" of that coin.

Figure 10:
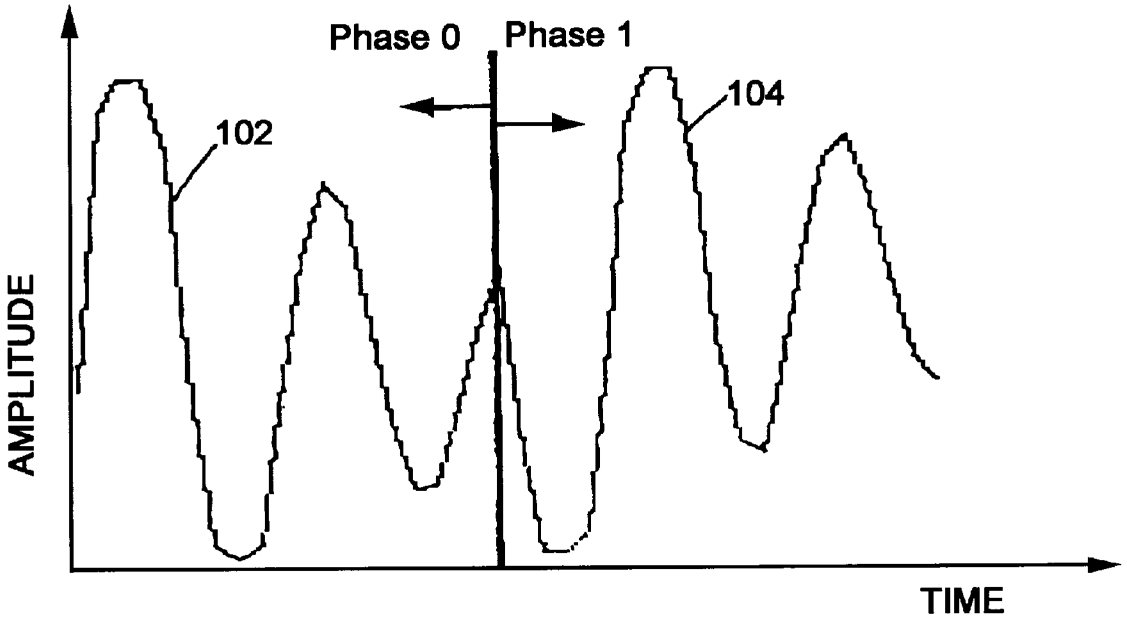
FIG. 10 is a graph showing exemplary ringing waveforms induced in sensor coils by opposite phases of a square wave.

For illustration purposes, FIG. 10 shows exemplary ringing waveforms 102 and 104 induced in the sensor coils 21 and 23. The ringing waveform 102 designated as phase 0 is generated in response to a step in the square wave with a rising (or falling) edge, and the ringing waveform 104 designated as phase 1 is in response to a subsequent step in the square wave with a falling (or rising) edge. The waveforms 102 and 104 are sampled, such as by means of an analog-to-digital (A/D) converter, to provides a plurality of data points representative of the waveforms. In a preferred implementation, a phase 0 waveform and the subsequent phase 1 waveform are detected at the moment the diameter or full width of the coin passes the magnetic field, and twenty (20) data points are taken from the waveform of each phase.

Figure 11A:
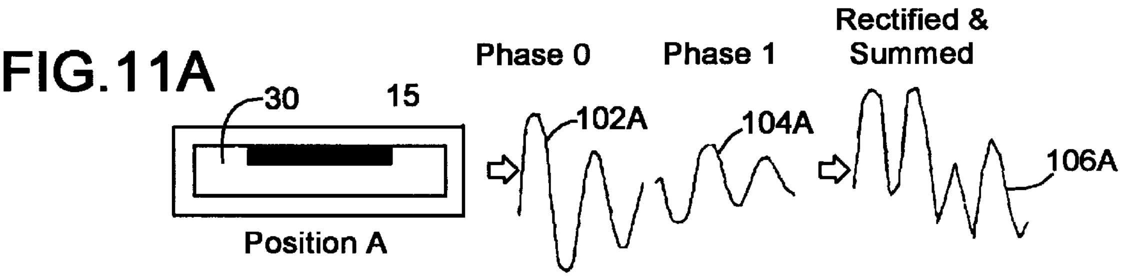
FIGS. 11A–C are schematic diagrams showing different coin positions in a coin slot of the apparatus of FIG. 2 with corresponding induced ringing waveforms and corresponding rectified and summed waveforms.
Figure 11B:
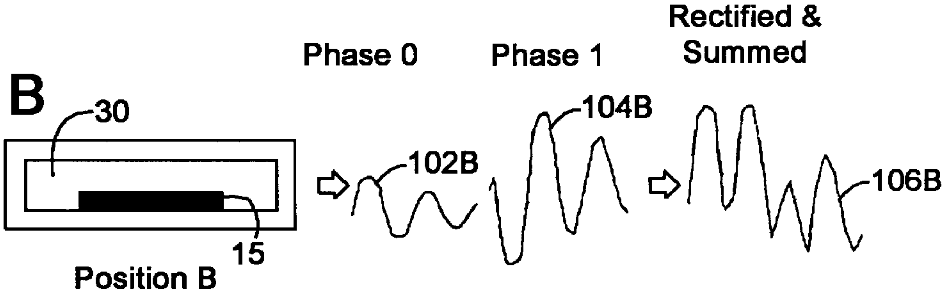
Figure 11C:
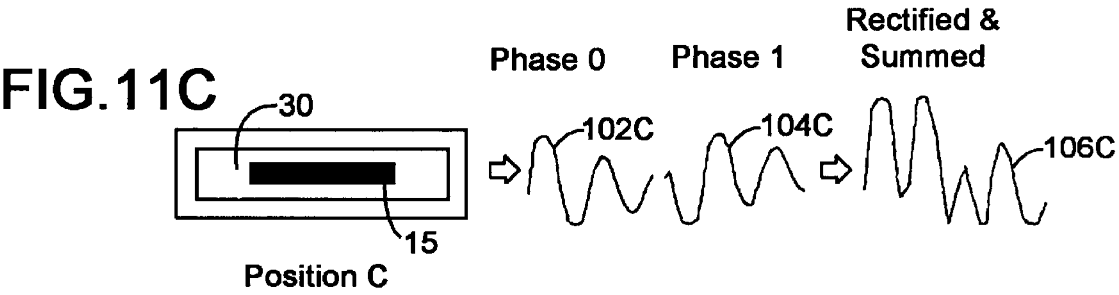

As the width of the slot 30 is typically designed to be greater than the width of the coin 15 to allow the coin to fall freely though, the coin may take any of the various positions in the slot when it crosses the magnetic field. The ringing waveforms induced in the sensor coils depend on the position of the coin in the slot. By way of example, FIGS.11 A–C show the phase 0 ringing waveforms 102A–C and phase 1 ringing waveforms 104A–C for three different coin positions. As can be seen in FIGS. 11A–C, the ringing waveforms change significantly with the different positions of the coin 15 in the slot 30.

In accordance with a feature of a preferred embodiment, data analysis on the coin-position dependent ringing waveforms is made significantly simpler and more reliable by combining the phase 0 and phase 1 waveforms in such a way to generate a substantially position-independent sum. More particularly, the sampled ringing waveform of each phase is first rectified. In a preferred embodiment, the rectification is done by software on the sampled data points of the waveforms. The rectified waveforms of phase 0 and phase 1 are then summed. As shown in FIGS. 11 A–C, the rectified and summed waveforms 106A–C for the three different coin positions are substantially identical. In other words, the rectified and summed ringing waveforms are substantially independent of the position of the coin 15 in the slot 30. Thus, the rectified and summed ringing waveform for a coin in its free-fall path through the coin identification sensor 20 provides substantially position-independent information of the coin.

Figure 12:
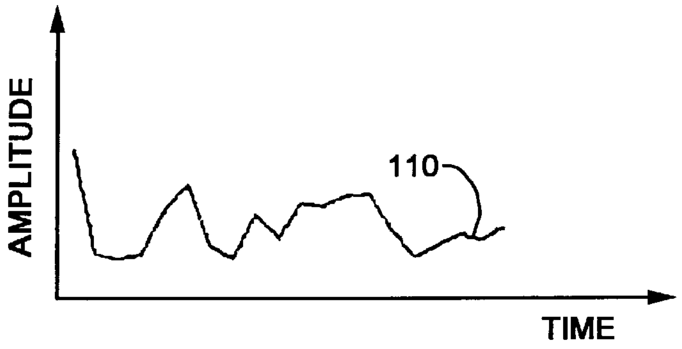
FIG. 12 is a graph showing an exemplary signature of a coin generated by the apparatus of FIG. 2.

In order to minimize the effects of changes in the environment, such as temperature and humidity changes, on the measured ringing signals, an "air measurement" is subtracted from the rectified and summed waveform for the coin. The air measurement is generated in generally the same way the rectified and summed waveform for the coin is generated, but without any coin in the slot 30. The air measurement may be taken at power-up and stored in the memory, and may be taken periodically during operation of the coin discriminating apparatus to reflect changes in the environment. Subtracting the air measurement from the rectified and summed waveform of the coin substantially removes environmental effects on the ringing characteristics of the coils. For illustration purposes, an exemplary waveform 110 after the subtraction of the air measurement is shown in FIG. 12. In a preferred implementation, such a waveform is used as the "signature" of the coin being identified. The coin is identified by comparing its signature to one or more prestored signatures of sample coins of different denominations. If a match with a pre-stored signature for a given coin type is found, the coin is deemed to be of that type.

The operation of the inventive coin discriminator 10 will now be explained in connection with the flowcharts illustrated in FIGS. 8A–8C. Those skilled in the art will appreciate that, although the flowcharts illustrate the programmed instructions performed by the microprocessor 80 of the coin discriminator 10, those programmed instructions can be implemented in many different ways without departing from the scope or the spirit of the invention. Although best described and illustrated with flowcharts, those skilled in the art will appreciate that the actual implementation of the programmed instructions need not be strictly sequential as suggested by the flowcharts. For example, the various routines described may run independently, sharing processor resources in a time-divided manner.

Figure 8A:
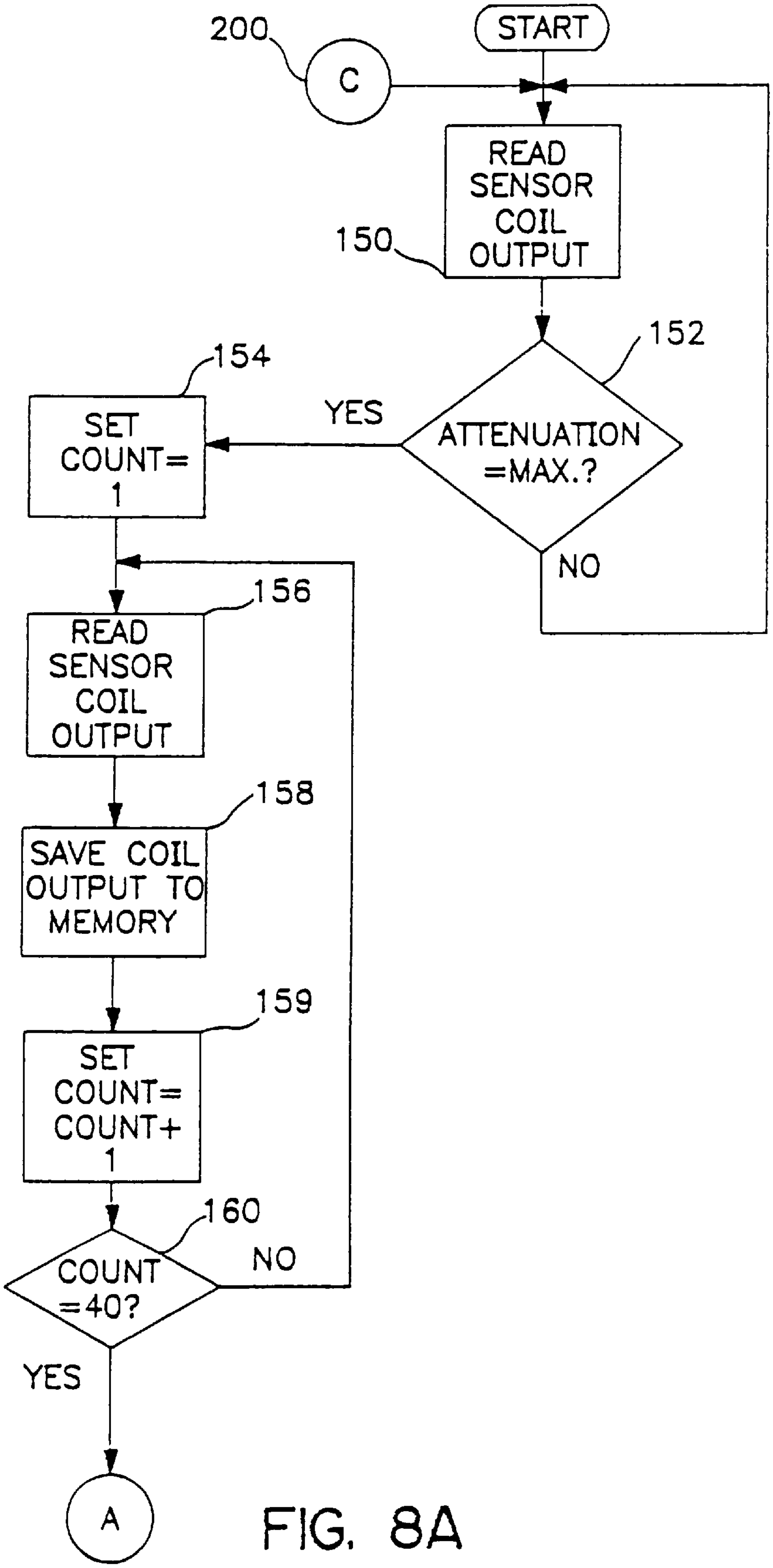
FIGS. 8A–8C are block diagram representations of the programmed steps performed by the microprocessor employed in the inventive coin discriminating apparatus.
Figure 8B:
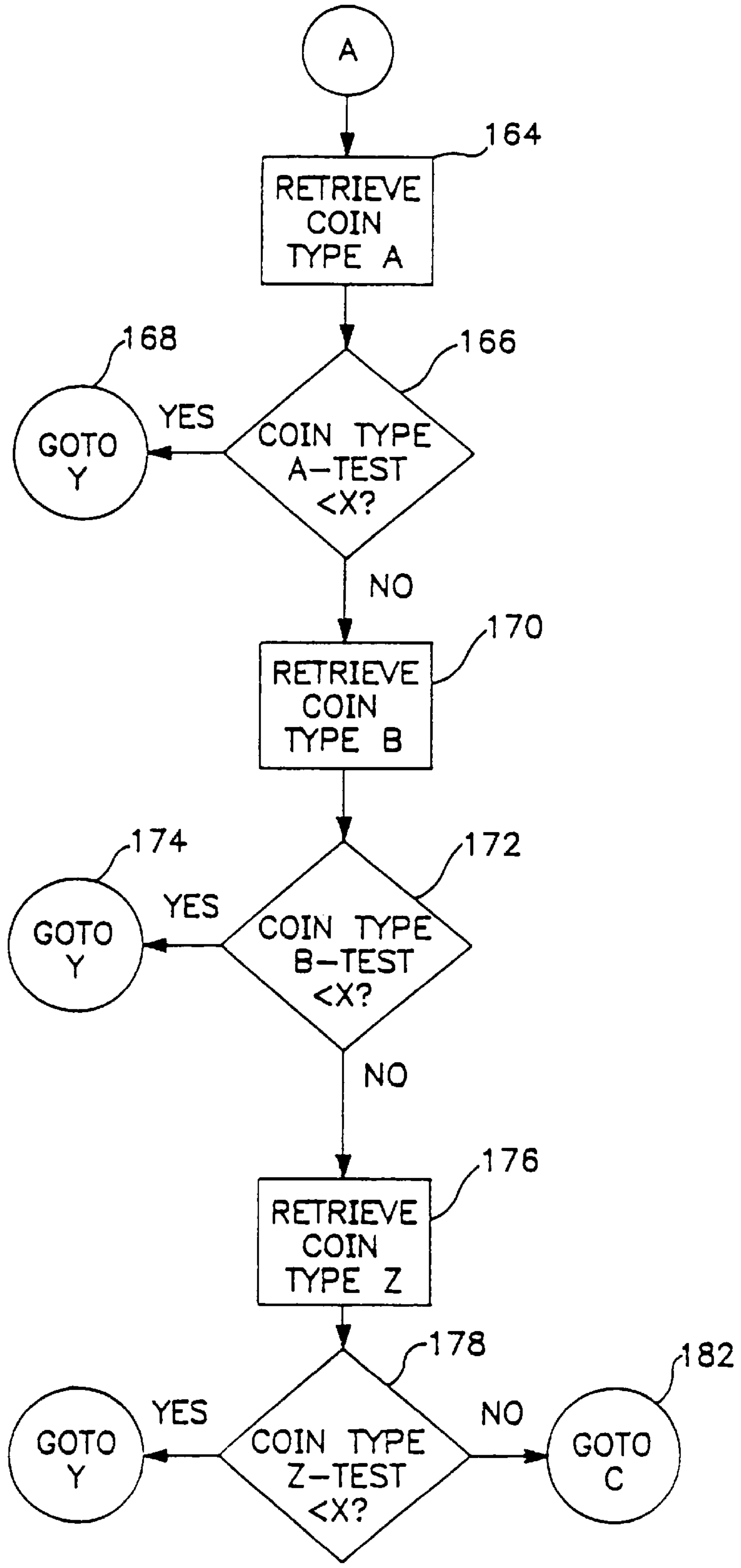
Figure 8C:
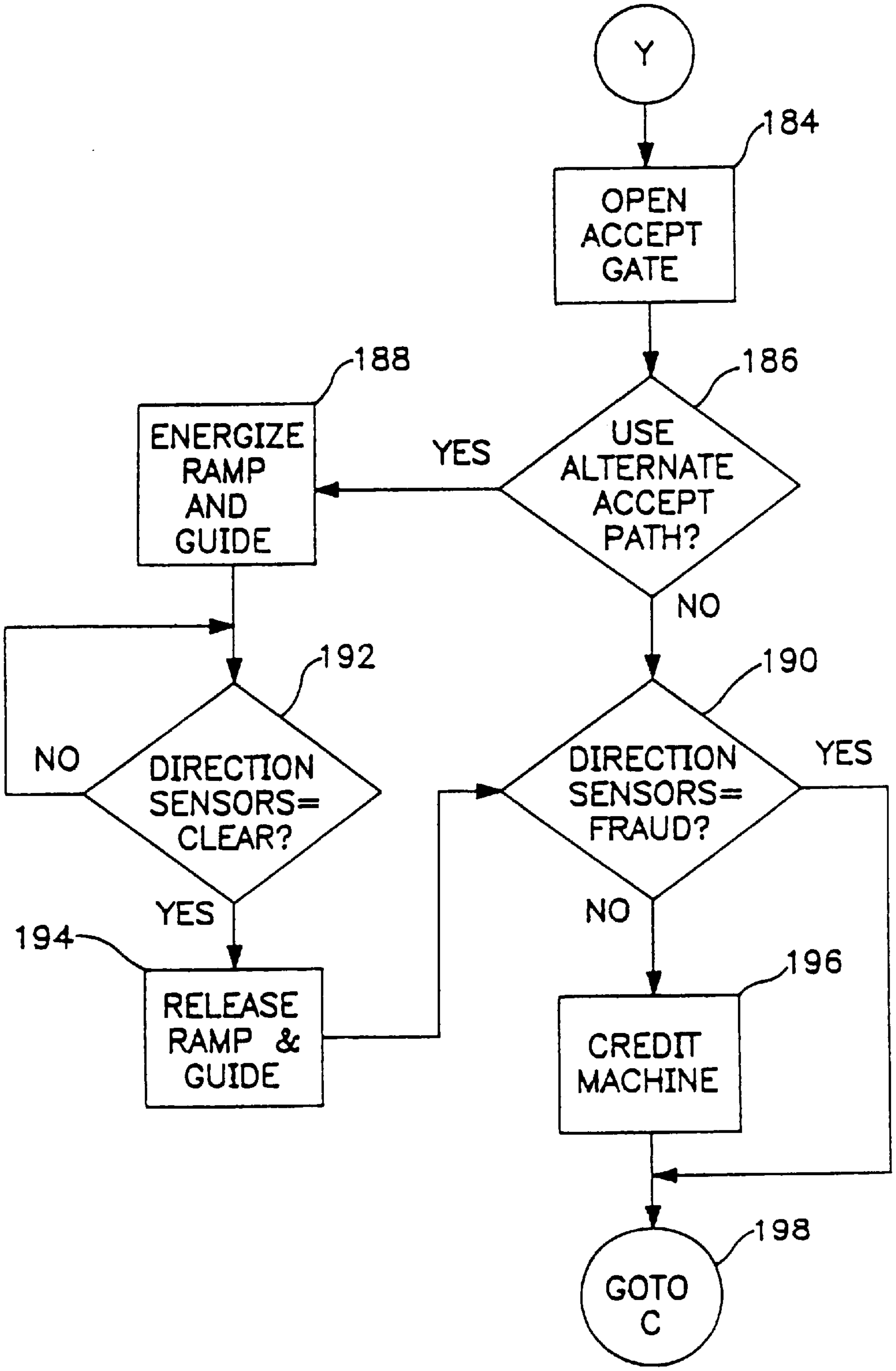

Turning first to FIG. 8A, the microprocessor 80 begins its routine by reading the output of inductive sensor coils 21 and 23 of the coin identification sensor 20 (Block 150). Armed with this information, the microprocessor 80 then determines whether the center of a coin 15 has entered the horizontal magnetic field generated by the drive coils 22, 24 of the coin identification sensor 20. Specifically, as mentioned above, the current through sensor coils 21, 23 in the coin identification sensor 20 will be attenuated by the presence of a coin in the horizontal magnetic field. Since the center of a coin 15 is coincident with its diameter regardless of the orientation at which that diameter is measured, when the center of the coin 15 passes through the horizontal magnetic field, the horizontal diameter of the coin 15 will likewise be in that magnetic field. In other words, the largest area of a round coin 15 will generally enter the horizontal magnetic field simultaneously with the center of that coin. As a result, the attenuation of the magnetic field sensed in inductive coils 21, 23 will be maximized when the center of the test coin 15 is in the horizontal magnetic field existing in the coin slot 30.

The inventive apparatus takes advantage of this characteristic by monitoring the output of sensor coils 21, 23 for maximum attenuation of the ringing waveforms. The preferred embodiment identifies the maximum attenuation state by noting an increase in the magnetic field sensed in coils 21, 23 after a period of attenuation. In other words, when a coin 15 enters the horizontal magnetic field, the field sensed in coils 21, 23 will decrease in a substantially monotonic manner until the center of the coin enters that field. As mentioned above, when the center of the coin 15 enters the horizontal magnetic field, the attenuation of the field sensed in coils 21, 23 will be maximized. As the coin 15 continues its vertical free fall through the coin discrimination apparatus 10, the magnetic field sensed in coils 21, 23 will increase as a smaller and smaller portion of the test coin will be present in the horizontal magnetic field at any given time. As with the increased attenuation of the field experienced by coils 21, 23 when the first half of the test coin 15 passes through the horizontal magnetic field, the second half of the coin 15 will cause a substantially monotonic decrease in the attenuation of the magnetic field sensed by coils 21, 23. Thus, when the current sensed in coils 21, 23 begins to increase after a period of decreasing, the microprocessor 80 of the coin discriminator 10 recognizes that maximum attenuation has occurred. The microprocessor 80 will then exit step 152 and enter step 154.

It should be noted that if maximum attenuation is not identified at step 152, the microprocessor 80 will return to step 150 and again read the output of the sensor coils 21, 23. The microprocessor 80 will remain in the loop defined by steps 150 and 152 until the maximum attenuation of the magnetic field in coils 21, 23 has been noted.

Upon entering step 154, the microprocessor 80 will set a "count" variable equal to 1. This variable is used to monitor the number of samples the apparatus 10 has recorded of the signature current appearing in coils 21, 23 as a given test coin 15 passes through the coin identification sensor 20. More specifically, after setting the count variable equal to 1, the microprocessor 80 will enter the sample loop defined by steps 156, 158, 159 and 160 where it will remain until the count variable indicates a predetermined number of samples have been taken.

In the sample loop, the microprocessor 80 will first read the output of the inductive coils 21, 23 in the coin identification sensor 20 (step 156). The microprocessor 80 will then enter step 158 where it will save the reading taken in step 156 in memory 82. Subsequently, the microprocessor 80 will update the count variable by 1 (step 159) and then determine whether the updated count is equal to a preselected sample number, such as twenty (20) (step 160). As shown in FIG. 8A, the microprocessor 80 will repeat steps 156–160 until the count variable equals the pre-selected sample number at which point it will advance to step 164 in FIG. 8B. In a preferred embodiment, the microprocessor 80 will record twenty samples for the ringing waveform of one phase and twenty samples for the ringing waveform of the opposite phase when the diameter or full width of a single coin 15 passes through sensor 20, as indicated by the maximum attenuation state discussed above. Those skilled in the art will appreciate that, although in the preferred embodiment twenty samples of the readings of coils 21, 23 are recorded for each phase, any number of such samples can be taken without departing from the scope or the spirit of the invention. After completing the sampling loop (steps 156–160), the microprocessor 80 will have stored a digitized signature representative of the test coin 15 in memory 82.

Upon completing the sampling loop (steps 156–160), the microprocessor 80 begins to compare the signature of the test coin 15 stored in memory 82 to the signatures of various sample coins 15 that are likewise stored in memory 82. Thus, at step 164, the microprocessor 80 retrieves the signature of a first coin type A from memory 82. Coin type A can represent any desired denomination or size of coin 15. As explained above, the signature of coin type A is preferably loaded into the memory 82 of the apparatus 10 at the time of manufacture along with the signatures of the other coin types.

After the signature of coin type A is retrieved, the microprocessor 80 subtracts the digital values constituting the signature of the test coin from the digital values constituting the signature of coin type A (step 166). If the absolute value of that difference is less than a predetermined value (X), then the test coin is identified as being the same as coin type A, and the microprocessor 80 opens the acceptance gate 50 (steps 168 and 184). If, however, the absolute value of the difference computed at step 166 is greater than X, the test coin is not the same as sample coin type A, and the microprocessor 80 proceeds to step 170.

The process of retrieving the digital signature of different coin types, computing the absolute value of the difference between the digital signatures of the test coin and the sample coin, and determining whether the test coin and the sample coin type are identical, is repeated in steps 170–178 until either a match is found and acceptance gate 50 is opened (step 184), or until the microprocessor 80 reaches step 182 without finding a match. If step 182 is reached, the test coin is invalid. Therefore, the acceptance gate 50 is left in the position shown in FIG. 2 and the test coin is diverted down the reject path 76.

Those skilled in the art will appreciate that the predetermined value "X" mentioned above determines how close of a match between the signatures of a test coin and a sample coin is required for an acceptance to occur. By reducing X to a lower positive value, the required closeness of the match is increased. In contrast, by increasing the value of X to a higher positive value, a wider range of coins will be identified as the compared sample coin in question. In the preferred embodiment, the same value X is used for each type of sample coin stored in memory. However, those skilled in the art will appreciate that different values of X can be set for different coin types if desired without departing from the scope or spirit of the invention.

Although other values might likewise be appropriate, in the presently preferred embodiments, X is assigned a value that is determined by the quality of the coin to be discriminated.

It should be noted that in some instances, coins of the same type, denomination and size nonetheless have different signatures when put through apparatus 10 due to variations in the chemistry of those coins. Such variations occur most frequently in tokens used in gaming applications. In instances where these variations occur, the signature of these coins tend to fall into 2 or 3 groups wherein all of the coins in a group have substantially the same signature.

To handle coins of this type, a signature of a sample coin from each group can be stored in memory. In other words, in the above-described comparison steps (e.g., steps 164–172), sample coin type "A" and sample coin type "B" may represent coins of the same size and denomination that, due to the manner in which they were manufactured, fall into two different signature groups. Thus, when a test coin is sampled for identification, it can be compared against signatures of sample coins for each of the signature groups of a particular denomination as well as against signatures of sample coins of different denominations.

Assuming that a valid coin has been noted (i.e., a match has been found somewhere in steps 164–178), the microprocessor 80 will open the acceptance gate 50 (step 184). It will then enter step 186.

If the apparatus has been programmed to take advantage of the ability of the coin discriminators to use alternate accept paths 78, 79, the microprocessor 80 will then determine whether the alternative path 78 should be used for the test coin currently being accepted. This determination can be made in any manner without departing from the scope or spirit of the invention. For example, the microprocessor 80 can be programmed to send one out of every five accepted coins to a hopper down alternative accept path 78.

In any event, if at step 186 it is determined that the coin being processed should be passed down the alternative accept path, the microprocessor 80 will energize the actuators 55, 57 associated with the diverter ramp 54, and the guide plate 56 to pivot those structures to the position shown in FIG. 3B (seep 188). The microprocessor 80 will then poll the direction sensors 60, 61 to determine whether the coin being processed has exited the diverter mechanism area (step 192). If the test coin has cleared the area, the microprocessor 80 returns the diverter ramp 54 and the guide plate 56 to the positions shown in FIG. 3A (step 194). If the coin has not cleared, the microprocessor 80 continues to poll the direction sensors 60, 61 (step 192) until the coin clears and it is safe to release the ramp 54 and guide plate 56 without jamming.

After releasing the ramp 54 and guide 56 (step 192), or after deciding that the alternate accept path 78 should not be used with the current coin (step 186), the microprocessor 80 enters step 190. At step 190, the microprocessor 80 analyzes the outputs of direction sensors 60, 61. If the coin is traveling in the correct direction, the microprocessor 80 credits the machine for the accepted coin in accordance with the identification made in steps 164–178 (step 196). For example, if the inventive coin discriminator 10 is being used in a vending machine, and it has identified an accepted coin as a U.S. quarter, the microprocessor 80 will credit the machine $0.25 in U.S. dollars. After making the credit (step 196) or if a fraud is detected, the microprocessor 80 will return to step 150 (FIG. 8A) via steps 198 and 200. The identification process will then begin anew with the next free falling coin.

Although the invention has been described and disclosed in connection with certain embodiments and procedures, it will be understood that there is no intent to in any way limit the invention to these particular embodiments. On the contrary, the intent is to cover all alternatives, modifications, and equivalents included within the spirit and scope of the invention as defined by the appended claims.

What is claimed is:

1. A coin discriminating apparatus for identifying a coin, comprising:

a coin path disposed to allow said coin to travel therethrough;

a coin identification sensor having at least one drive coil energized by a voltage step to generate a magnetic field across the coin path and having at least one sensor coil to generate ringing waveforms induced by the magnetic field generated by the drive coil energized by the voltage step when the coin passes through the magnetic field; and control circuitry for measuring and processing the ringing waveforms to derive a signature of said coin for identification thereof.

2. A coin discriminating apparatus as in claim 1, wherein the control circuitry measures the ringing waveforms when a full width of said coin passes through the magnetic field.

3. A coin discriminating apparatus as in claim 1, wherein the coin identification sensor includes two drive coils disposed on two sides of the coin path for generating the magnetic field, and further including a signal generator for generating a square wave for driving the drive coils.

4. A coin discriminating apparatus as in claim 3, wherein the ringing waveforms includes a first ringing waveform generated when the drive coils are driven by a first voltage step in a first phase and a second ringing waveform when the drive coils are driven by a second voltage step in a second phase opposite to the first phase, and wherein the control circuitry rectifies and sums the first and second ringing waveforms to generate a rectified and summed waveform.

5. A coin discriminating apparatus as in claim 4, wherein the control circuitry subtracts an air measurement from the rectified and summed waveform to derive the signature of the coin.

6. A coin discriminating apparatus as in claim 5, wherein the control circuitry includes a memory for storing reference signatures, and wherein the control circuitry compares the signature of the coin with the reference signatures for identifying the coin.

7. A coin discriminating apparatus as in claim 1, wherein the coin identification sensor has two sensor coils and further includes:

a support structure having a coin slot formed therein defining the coin path and a pair of inner elongated bobbins and a pair of outer elongated bobbins disposed on either side of the coin slot, the pair of sensing coils wound on respective inner bobbins; and a pair of drive coils wound around respective outer bobbins of the support structure for generating the magnetic field.

8. A coin discriminating apparatus as in claim 7, wherein the sensor coils and drive coils are wound in an exaggerated elliptical form around the bobbins of the support structure.

9. A coin discriminating apparatus as in claim 1, further including a diverter mechanism controlled by the control circuitry to direct said coin to travel along at least one accept path when the signature of the coin matches one of a set of reference signatures and to direct said coin to travel along a reject path when no match is found between the signature of said coin and the set of reference signatures.

10. A coin discriminating apparatus as claim 9, wherein the diverter mechanism comprises a diverter ramp and a guide plate with associated respective actuators, the actuators moving the diverter ramp and the guide plate with respect to the at least one accept path so as to guide the said coin through the at least one accept path.

11. The apparatus set forth in claim 9, further comprising:

at least one optical sensor operably coupled to the control circuitry and disposed downstream of the coin identification sensor and at least partially aligned with said at least one accept path and the reject path, said at least one optical sensor providing timing and travel direction information regarding the said coin to the control circuitry.

12. A coin discriminating apparatus as in claim 1, wherein the coin path is disposed to allow the coin to travel in a free fall motion through the magnetic field generated by the drive coil.

13. A coin discriminating apparatus for identifying a coin comprising:

a coin identification sensor having a coin slot opening to a coin path for the coin to travel through, a pair of sensor coils flanking the coin slot, and a pair of drive coil disposed adjacent respective sensor coils for generating a magnetic field across the coin slot;

driving circuitry for energizing the drive coils with voltage steps in alternating directions to induce a ringing waveform in the sensor coils in response to each voltage step energizing the drive coils; and control circuitry measuring the ringing waveforms when said coin passes through the magnetic field to derive a signature of said coin and comparing the signature of the coin with a set of pre-stored reference signatures to find a match.

14. A coin discriminating apparatus as in claim 13, wherein the control circuitry measures the ringing waveforms when a full width of the coin passes through the magnetic field across the coin slot.

15. A coin discriminating apparatus as in claim 13, wherein the control circuitry measures a pair of ringing waveforms corresponding to two voltage steps in opposite phases and generating a rectified and summed waveform from the pair of measured ringing waveforms.

16. A coin discriminating apparatus as in claim 15, wherein the control circuitry subtracts an air measurement from the rectified and summed waveform to derive the signature of the coin.

17. A coin discriminating apparatus as in claim 13, wherein the coin path is disposed for coin to travel in a free-fall motion through the magnetic field generated by the drive coils.

18. A method for identifying a coin, comprising the steps of:

setting the coin to travel along a coin path;

energizing at least one drive coil disposed adjacent the coin path with voltage steps in opposite directions to generate horizontal alternating magnetic fields across the coin path;

detecting a ringing waveform induced in at least one sensor coil disposed adjacent the coin path in response to each of the voltage steps energizing the drive coil when the coin passes through the alternating magnetic fields; and deriving a signature of the coin from the detected ringing waveforms for identifying the coin.

19. A method as in claim 18, wherein the step of detecting detects the ringing waveforms when a full width of the coin passes through the alternating magnetic fields.

20. A method as in claim 18, wherein the step of detecting detects two ringing waveforms corresponding to two voltage steps of opposite phases, and wherein the step of deriving generates a rectified and summed waveform from the two ringing waveforms.

21. A method as in claim 20, wherein the step of deriving further includes subtracting an air measurement from the rectified and summed waveform.

22. A method as in claim 18, further including the step of comparing the signature of the coin with a set of reference signatures to find a match.

23. A method as in claim 18, wherein the step of setting sets the coin to travel in a free fall motion through the alternating magnetic fields.

* * * * *